(12) United States Patent
Wilharm

(10) Patent No.: US 7,778,529 B2
(45) Date of Patent: Aug. 17, 2010

(54) METHOD FOR SUPPLYING ELECTRICAL POWER TO A DC MOTOR WHICH CAN BE COMMUTATED ELECTRONICALLY VIA A SEMICONDUCTOR POWER OUTPUT STAGE

(75) Inventor: Torsten Wilharm, Ottersweier (DE)

(73) Assignee: Robert Bosch GmbH, Stuttgart (DE)

( * ) Notice: Subject to any disclaimer, the term of this patent is extended or adjusted under 35 U.S.C. 154(b) by 176 days.

(21) Appl. No.: 11/997,804

(22) PCT Filed: Sep. 7, 2006

(86) PCT No.: PCT/EP2006/066135

§ 371 (c)(1),
(2), (4) Date: Feb. 4, 2008

(87) PCT Pub. No.: WO2007/033912

PCT Pub. Date: Mar. 29, 2007

(65) Prior Publication Data
US 2008/0232786 A1   Sep. 25, 2008

(30) Foreign Application Priority Data
Sep. 23, 2005   (DE) ................. 10 2005 045 401

(51) Int. Cl.
*H02P 7/06* (2006.01)
(52) U.S. Cl. .................. 388/813; 318/800; 318/801; 318/606; 318/799; 318/599; 318/400.24; 318/400.23; 318/400.27; 318/400.28; 388/804; 388/805; 363/26; 363/41
(58) Field of Classification Search ............ 318/400.01, 318/700, 400.07, 400.17, 400.2, 800, 801, 318/606, 799, 599, 400.24, 400.23, 400.27, 318/400.28; 388/803, 819, 822, 823, 813, 388/804, 805; 363/26, 41
See application file for complete search history.

(56) References Cited

U.S. PATENT DOCUMENTS 4,443,750 A * 4/1984 Altena .................. 318/808

(Continued)

FOREIGN PATENT DOCUMENTS

DE    10127670 A1    9/2002

(Continued)

OTHER PUBLICATIONS

Safi, S.K., Phd., Analysis and simulation of the high-speed torque performance of brushless DC motor drives, IEE Proceedings Electric Power Applications, 1995, pates 191-200, vol. 142, No. 3.

(Continued)

*Primary Examiner*—Rita Leykin
(74) *Attorney, Agent, or Firm*—Michael Best & Friedrich LLP

(57) ABSTRACT

A method is proposed for supplying electrical power to a DC motor (16) which can be commutated electronically via a semiconductor power output stage (28), preferably a three-phase DC motor, through which a control unit (22) passes current in blocks, corresponding to the signals from a rotor position sensor (20). Current is passed through the motor (16) variably in steps, in such a manner that the magnitude and/or the duration and/or the trigger angle of the current blocks can be varied as a function of the rotation speed and/or of the load, with respect to the profile of the induced voltage (E).

20 Claims, 3 Drawing Sheets

U.S. PATENT DOCUMENTS

| | | | |
|---|---|---|---|
| 4,843,296 A * | 6/1989 | Tanaka | 318/800 |
| 5,339,013 A * | 8/1994 | Nakai et al. | 318/400.12 |
| 5,414,615 A * | 5/1995 | Kumar et al. | 363/95 |
| 5,739,650 A * | 4/1998 | Kimura et al. | 318/400.07 |
| 6,121,736 A * | 9/2000 | Narazaki et al. | 318/400.35 |
| 6,995,679 B2 * | 2/2006 | Eskritt et al. | 340/686.1 |
| 7,180,256 B2 * | 2/2007 | Eskritt et al. | 318/400.14 |
| 2002/0116100 A1 * | 8/2002 | Shimazaki et al. | 701/22 |

FOREIGN PATENT DOCUMENTS

| | | |
|---|---|---|
| DE | 10247900 A1 | 4/2004 |
| JP | 2000152681 | 5/2000 |
| JP | 2003341534 | 12/2003 |

OTHER PUBLICATIONS

PCT/EP2006/066135 International Search Report.

* cited by examiner though depicted in FIG. 1 only with one line, it can also be embodied as a multi-pole or as a data bus.

METHOD FOR SUPPLYING ELECTRICAL POWER TO A DC MOTOR WHICH CAN BE COMMUTATED ELECTRONICALLY VIA A SEMICONDUCTOR POWER OUTPUT STAGE

BACKGROUND OF THE INVENTION

The invention relates to a method for supplying electrical power to a DC motor which can be commutated electronically via a semiconductor power output stage, preferably a three-phase DC motor, as described in DE 102 47 900 A1. This document discloses a method for supplying electrical power to a DC motor that can be commutated electronically having a control for the phase currents of the motor, which control receives as control signals, among other things, signals from a current sensor in a common lead of the semiconductor switch of the power output stage as well as signals from a sensor device for the rotor position. Power is supplied to the motor in this case either in the form of the block being energized with current blocks of 120° el respectively or alternatively in the form of a sinusoidal application of current having a half-wave duration of 180° el. In this case, even though using 120° block energizing permits the use of a simple and cost-effective control device, efficiency of the motor is low, however. Sinusoidal energizing requires a complex calculation of the respective switching time points and current levels as well as very complex sensor technology for precisely recording the rotor position.

SUMMARY OF THE INVENTION

The invention is based on the objective of disclosing a method for supplying electrical power to a DC motor which can be commutated electronically via a semiconductor power output stage, preferably a three-phase DC motor, which method allows an increase in the power density and simultaneously a reduction in the torque ripple of a block-energized, electronically commutated motor, with low switching and computing expenses. The commutation time points in this case are supposed to be triggered directly by a simple sensor arrangement without expensive calculation of the commutation time points by the control arrangement. This objective is attained, in that the current is designed to pass through the motor variably in steps. This allows one to achieve a considerable improvement of the motor efficiency as well as more flexible triggering to reduce the torque ripple utilization with a low level of additional expense as compared to a simple 120° block energizing without pre-commutation.

It has proven to be especially expedient if the motor is operated in different rotational speed ranges with different load-dependent and rotational speed-dependent energizing patterns just via the evaluation of the sensor signal without requiring a calculation of the commutation time points. In the case of three-phase motors with an average size having a power consumption between approx. 20 A and 200 A, as used for example in large unit numbers as control motors or fan motors in motor vehicles, it has proven to be especially advantageous if, in a lower rotational speed range, current blocks with a block length of 150° el and a trigger angle of 0 to 30° el, preferably +15° el, in a middle rotational speed range, current blocks with a block length of 180° el and a trigger angle of −30° el to 0° el, preferably −15° el, as well as, in an upper rotational speed range, current blocks with a block length of 180° el and a trigger angle of −30 to −60° el, preferably −45° el, are used in each case with respect to the zero passage of the induced voltage E.

In this case, digital Hall sensors, which are relatively cost-effective and supply sufficiently precise position signals, are preferably used as position sensors. To reduce the torque ripple, it is expedient, in the areas having three-phase current flow, to also change the magnitude of the current within the current block in such a manner that with variously high current blocks approximately the same maximum values of the achieved torques are set in two-phase or three-phase energizing operation.

Additional details and advantageous embodiments of the method in accordance with the invention are yielded from the subordinate claims and from the description of the exemplary embodiment.

DETAILED DESCRIPTION

Figure 1:
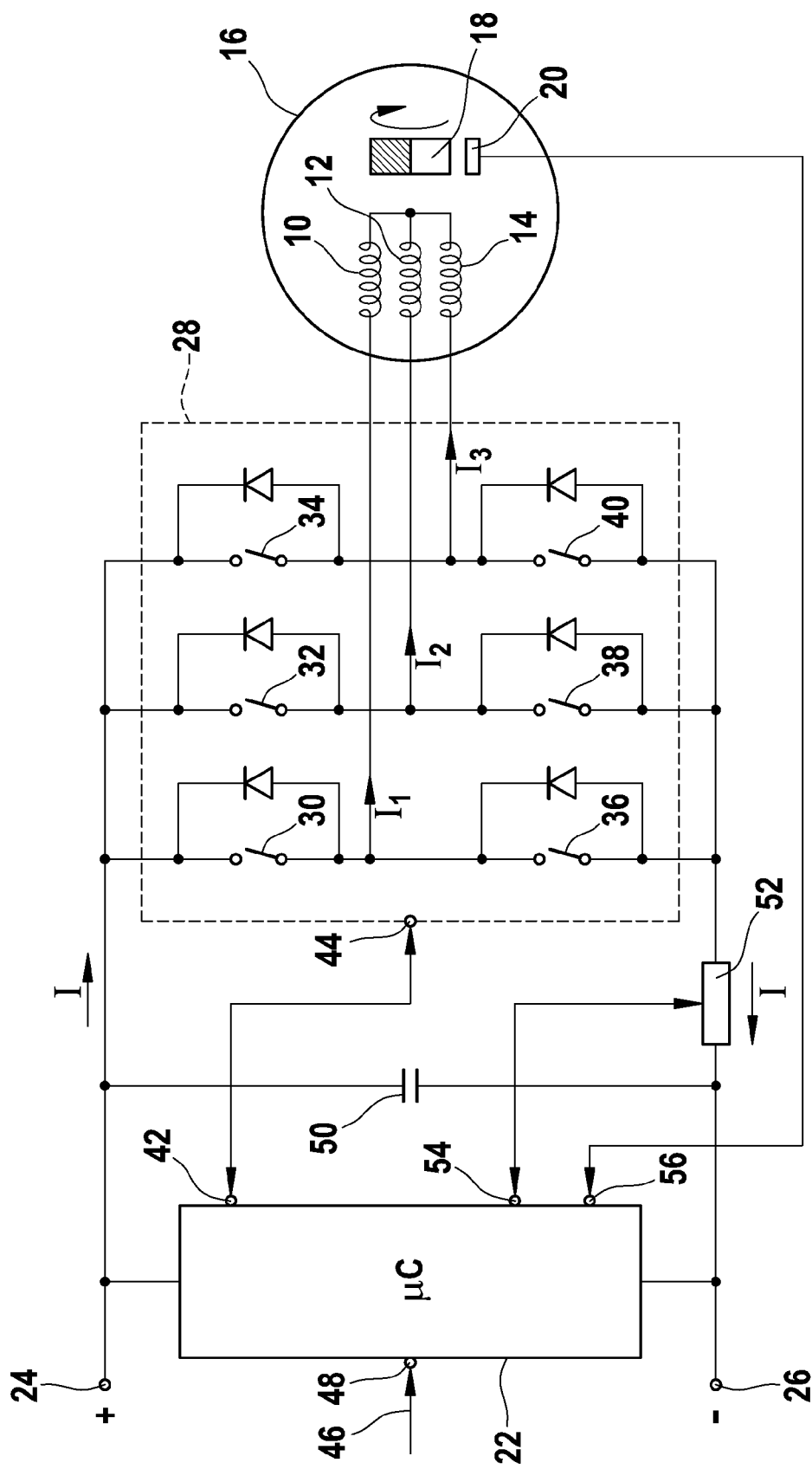
FIG. 1 A basic circuit diagram of a power supply in accordance with the invention of an electric motor that can be commutated electronically.

In FIG. 1 windings of a three-phase, electronically commutable DC motor 16 that are in a star connection are designated by 10, 12, and 14. Said DC motor cooperates with a permanent magnetic rotor 18. The respective position of the rotor is monitored by a sensor device 20, which supplies the signals concerning rotor position to a control unit 22 embodied as a microcontroller. The sensor device is embodied in a known manner with at least one Hall element per phase and supplies at least two rotor position signals per phase with each electrical revolution of the rotor. The Hall sensors evaluate either the field of the working magnet or a separate sensor magnet with the same number of poles and are arranged such that, in the case of a three-phase motor, six different rotor positions can be uniquely derived from the three signals (3 bits), offset expediently by 120° el.

The power supply for the motor 16 and the control unit 22 supply a DC voltage network with a positive pole 24 and a negative pole 26, on which the motor windings can be attached via an inverter 28. The inverter 28 is assembled in a known manner in a half-bridge circuit (B6 circuit) with semiconductor switches 30, 32 and 34 on the positive side and semiconductor switches 36, 38, and 40 on the negative side of the DC voltage network, wherein all switches are respectively bridged by a free-wheeling diode (not designated in further detail). The supply current I1 for the winding 10 is tapped between switches 30 and 36, the supply current I2 for the winding 12 is tapped between switches 32 and 38 and the supply current I3 for the winding 14 is tapped between switches 34 and 40. The triggering of the inverter 28 by the control unit 22 is depicted schematically as an arrow from the output 42 of the control unit to the control input 44 of the inverter. The motor control as a whole is preset by a target value signal 46 at the input 48 of the control unit 22, which also draws its supply voltage from the DC voltage network 24, 26. To improve electromagnetic compatibility, the DC voltage network is also bridged by an intermediate circuit capacitor 50.

Measurement of the entire supply current I for the motor 16 is accomplished by means of a shunt 52, which is switched on in the connecting line to the negative pole 26 of the DC voltage network and the current signal required for control is supplied in a known manner via an amplifier and an A/D converter to an input 54 of the control unit 22. The intermediate circuit current I is regulated in a suitable manner to the target value preset by the control unit 22. This can be accomplished for example by limiting the maximum current. In the process, when the current limit is reached, the corresponding semiconductor switch is turned off and turned on again at the end of the respective cycle.

The rotor position signals generated by the sensor device 20 are applied to an input 56 of the control unit 22. In detail, the triggering method for the power supply of the motor 16 is explained in greater detail on the basis of the diagram in the following figures. In this case, we are dealing with a modified, rotational speed-dependent variable block energizing, which with a low additional cost as compared to known block energizing with a fixed block length of 120° el makes possible a clear increase in the motor power with a simultaneous reduction in the torque ripple. This additional cost is comprised in particular of sensor technology, which requires an additional sensor to double the angular resolution, i.e., 4 sensors (4 bits) are required for 12 required positions, while only 3 sensors (3 bits) are required for 6 required positions.

Figure 2A:
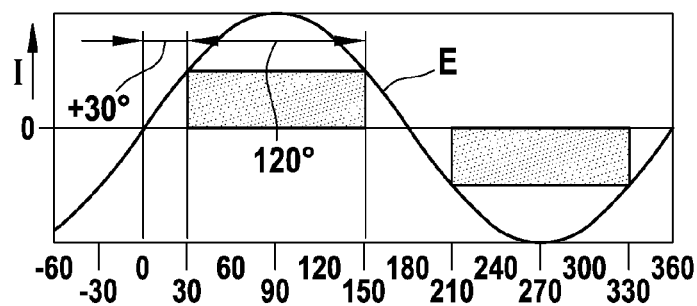
FIG. 2 Examples of various energizing patterns for a phase of an electronically commutated, three-phase electric motor with different block lengths and block forms as well as different trigger angles with respect to the induced voltage E.
Figure 2B:
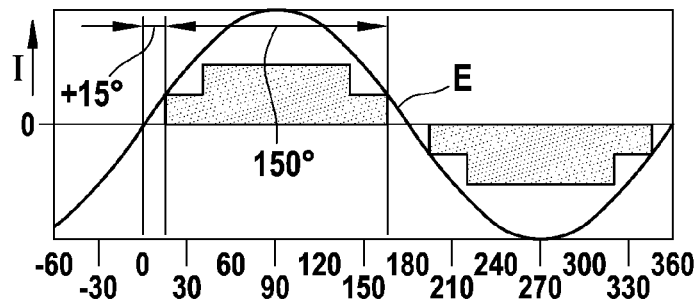

To improve clarity FIG. 2 depicts different energizing patterns each only for a single phase as follows:

FIG. 2a depicts conventional block energizing with a block length of 120° el and a trigger angle of +30° el, and FIG. 2b depicts advantageous block energizing in accordance with the invention in a lower rotational speed range with a block length of 150° el and a trigger angle of +15° el, which switches after 30° el respectively between two-phase and three-phase energizing.

Figure 2C:
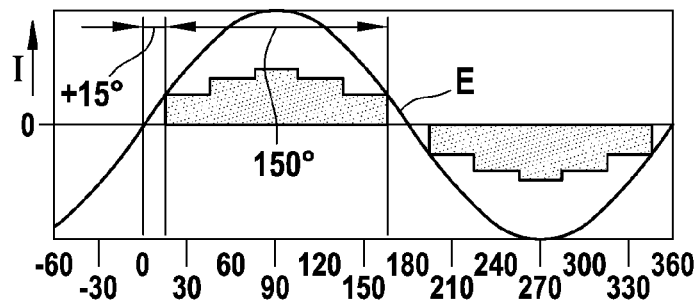

FIG. 2c depicts an energizing pattern in accordance with the invention that corresponds to FIG. 2b, wherein, however, the energizing magnitude in the middle, three-phase range of the block has also been raised to reduce the torque ripple. The effect of this increase in current is explained in more detail on the basis of the diagrams in FIG. 4.

Figure 2D:
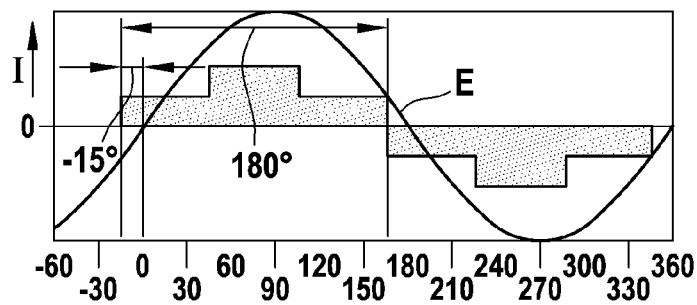

FIG. 2d depicts an energizing pattern in accordance with the invention with a 180° el current block, which features a trigger angle of −15° el with respect to the zero passage of the induced voltage E. The application of this energizing type is increasing power in the center rotational speed range of the motor, while the energizing pattern corresponding to FIG. 2b or 2c provides advantages in the lower rotational speed range, as will be explained in greater detail on the basis of FIG. 3.

Figure 2E:
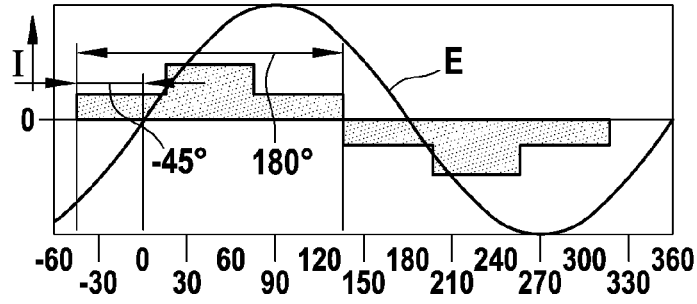

The energizing pattern in accordance with FIG. 2e finds its application in the upper rotational speed range of the motor. We are dealing in this case with 180° el block energizing with a trigger angle of −45° el with respect to the zero passage of the induced voltage E, which makes a clear increase in rotational speed possible.

Figure 3:
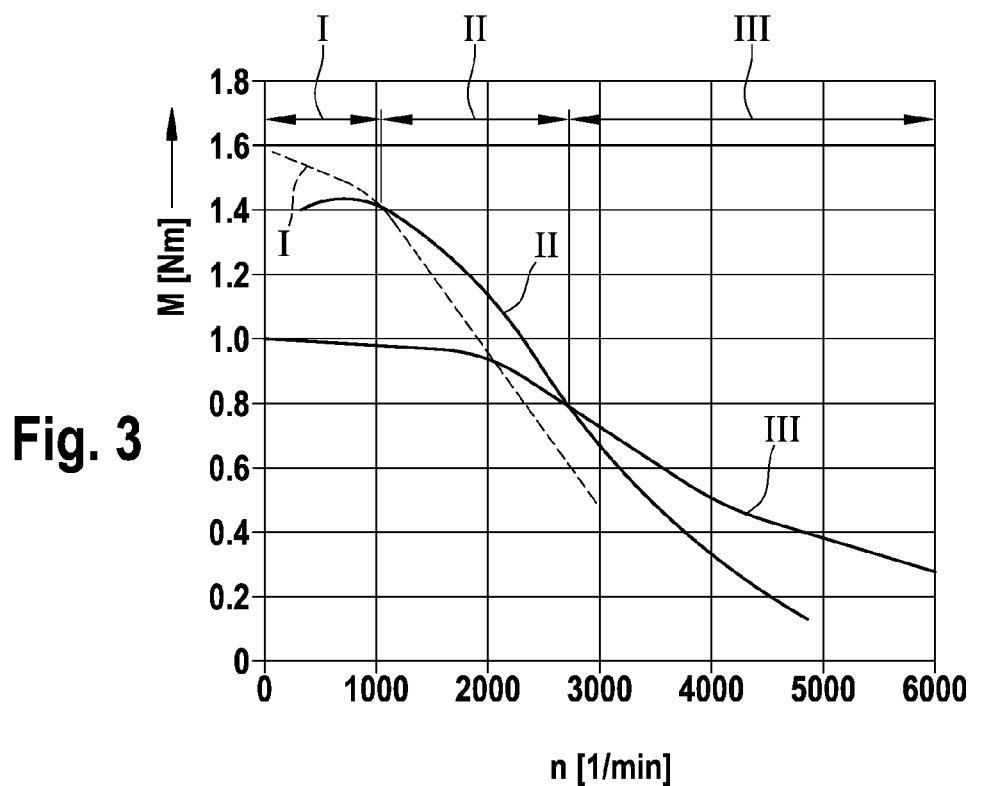
FIG. 3 Examples of the progression of the different torques when energizing a three-phase motor with different energizing patterns in different rotational speed ranges.

FIG. 3 depicts the different progression of the torques of the motor as a function of the rotational speed, whereby Curves I, II and III are based on the previously described, different energizing patterns. The energizing in the range of Curve Section I corresponds to FIG. 2b or 2c, the energizing of Curve Section II corresponds to the depiction in FIG. 2d and the energizing of Curve Section III corresponds to the illustration in FIG. 2e. It is evident from the various curves that a clear increase in torque and increase in rotational speed can be achieved by the different energizing patterns in the different rotational speed ranges. The cause of it is that with increasing rotational speed, the reactive impedance of the motor increases and consequently the motor current lags behind in terms of its phase position of the voltage. This can be compensated for by switching on the current earlier in the form a pre-commutation, thereby increasing the power of the motor. In addition, the motor current can be built up more quickly by the pre-commutation since the counteracting induced voltage at the switch-on time of current is lower. In addition, the motor current at the end of the block can degrade more quickly since at this point in time the counteracting inducted voltage is greater and the current consumption accelerates. As a result, the available current/time surface increases overall and therefore the power of the motor.

Another advantageous effect of the energizing in accordance with the invention, which also contributes to the torque progression depicted in FIG. 3, is caused by the fact that the energizing blocks generate a magnetic field, which partially counteracts the field of the permanent magnet in the rotor 18 of the motor 16. This effect can be utilized advantageously with high rotational speeds in order to still be able to operate the motor in spite of the high counteracting inducted voltage.

Figure 4:
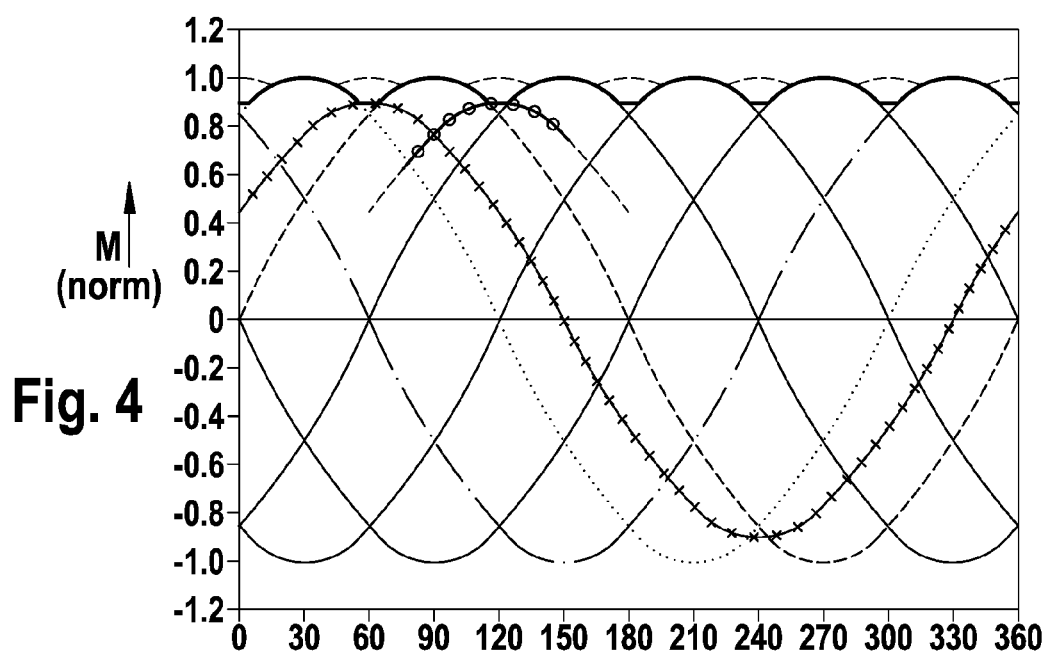
FIG. 4 An example of the progression of the torques of a three-phase electronically commutated DC motor when energizing with 150° current blocks with constant and alternating current levels.

FIG. 4 shows in a standardized depiction an example of the use of 150° el energizing with a trigger angle of 15° el in accordance with Torque Curve I in FIG. 3. In this case, a twelve-pulse torque progression is generated, whereby the torque ripple in the lower rotational speed range is reduced. The resulting twelve-pulse torque is depicted with a thicker continuous line. In the process, two or three phases are alternatingly energized after 30° el respectively. The current to be regulated is always the full intermediate circuit current, which is divided into two phases in the three-phase energized sections and flows there at half level respectively. Because of the division of the current into two phases, the resulting maximum torque in the three-phase range is somewhat lower than in the sections where the full phase current flows in two phases. By raising the current intensity in three-phase operation, however, the maximum torque in three-phase operation can be raised to the level of the torque in two-phase operation, as depicted in FIG. 4 by the dashed progression of the torque characteristic curve. As a result, the torque ripple can be reduced further. In the process, in three-phase operation the semiconductor switches from two-phases are connected in parallel and thus the current consumption and the heating of these switches are reduced with the same power output. Herein lies a further advantage of the method in accordance with the invention.

In accordance with the twelve-pulse torque progression depicted in FIG. 4 for the lower rotational speed range with 150° el block energizing, an optional alternating current level yields, in an analogous manner, the torque progression with 180° el block energizing with a trigger angle of −15° el in the middle rotational speed range and with a trigger angle of −45° el in the upper rotational speed range in accordance with Curves II and III in FIG. 3. As a result, it is possible to dispense with a separate depiction of these torque progressions in the drawing. The trigger angle for the use of block energizing is yielded respectively from the angle difference between the positive flank of Current I related to the positive zero passage of the induced voltage E. The angle is considered positive if the current flank follows the voltage zero passage temporally.

The invention claimed is:

1. Method for supplying electrical power to a DC motor which can be commutated electronically via a semiconductor power output stage, through which a control unit passes current in blocks, corresponding to the signals from a rotor position sensor, the method comprising:

passing the current through the motor (16) variably in steps, in such a manner that the magnitude and/or the duration and/or the trigger angle of the current blocks (I; FIG. 2) can be varied as a function of the rotational speed and/or of the load, with respect to the profile of the induced voltage (E);

energizing a three-phase motor (16) in a lower rotational speed range (I) with a block length of 150° el and a trigger angle of 0 to 30° el with respect to the zero passage of the induced voltage (E);

energizing the three-phase motor (16) in a middle rotational speed range (II) with a block length of 180° el and a trigger angle of −30° el to 0° el with respect to the zero passage of the induced voltage (E); and energizing the three-phase motor (16) in a upper rotational speed range (III) with a block length of 180° el and a trigger angle of −30 to −60° el with respect to the zero passage of the induced voltage (E).

2. Method according to claim 1, characterized in that the current blocks (I) can be adjusted to presetable block lengths between 120° el and 180° el.

3. Method according to claim 1, characterized in that the current blocks (I) can be adjusted to presetable block lengths between 150° el and 180° el.

4. Method according to claim 1, characterized in that the magnitude of the current (I) within a block can be changed within the sense of a reduction in the torque ripple of the motor (16).

5. Method according to claim 4, characterized in that the magnitude of the current (I) within a block can be raised in sections.

6. Method according to claim 1, characterized in that the trigger angle of the current blocks (I) can be changed as a function of the rotational speed between +15° el and −75° el, related to the zero passages of the indicated voltage (E).

7. Method according to claim 1, characterized in that the size and/or the position of the current blocks (I) can be preset by a sensor device (20).

8. Method according to claim 7, characterized in that the size and/or the position of the current blocks (I) can be preset by digital Hall sensors.

9. Method according to claim 1, characterized in that when the three-phase motor (16) is energized in the lower rotational speed range (I) with a block length of 150° el the trigger angle is +15° el.

10. Method according to claim 1, characterized in that when the three-phase motor (16) is energized in the middle rotational speed range (II) with a block length of 180° el the trigger angle is 15° el.

11. Method according to claim 1, characterized in that when the three-phase motor (16) is energized in the upper rotational speed range (III) with a block length of 180° the trigger angle is −45° el.

12. Method according to claim 2, characterized in that the current blocks (I) can be adjusted to presetable block lengths between 150° el and 180° el.

13. Method according to claim 12, characterized in that the magnitude of the current (I) within a block can be changed within the sense of a reduction in the torque ripple of the motor (16).

14. Method according to claim 13, characterized in that the magnitude of the current (I) within a block can be raised in sections.

15. Method according to claim 14, characterized in that the trigger angle of the current blocks (I) can be changed as a function of the rotational speed between +15° el and −75° el, related to the zero passages of the indicated voltage (E).

16. Method according to claim 15, characterized in that the size and/or the position of the current blocks (I) can be preset by a sensor device (20).

17. Method according to claim 16, characterized in that the size and/or the position of the current blocks (I) can be preset by digital Hall sensors.

18. Method according to claim 17, characterized in that when the three-phase motor (16) is energized in the lower rotational speed range (I) with a block length of 150° el the trigger angle is +15° el.

19. Method according to claim 18, characterized in that when the three-phase motor (16) is energized in the middle rotational speed range (II) with a block length of 180° el the trigger angle is −15° el.

20. Method according to claim 19, characterized in that when the three-phase motor (16) is energized in the upper rotational speed range (III) with a block length of 180° el the trigger angle is −45° el.

* * * * *